May 23, 1961　　　A. J. WILSON　　　2,985,202
CIRCULAR SAW SAFETY DEVICE
Filed April 12, 1960
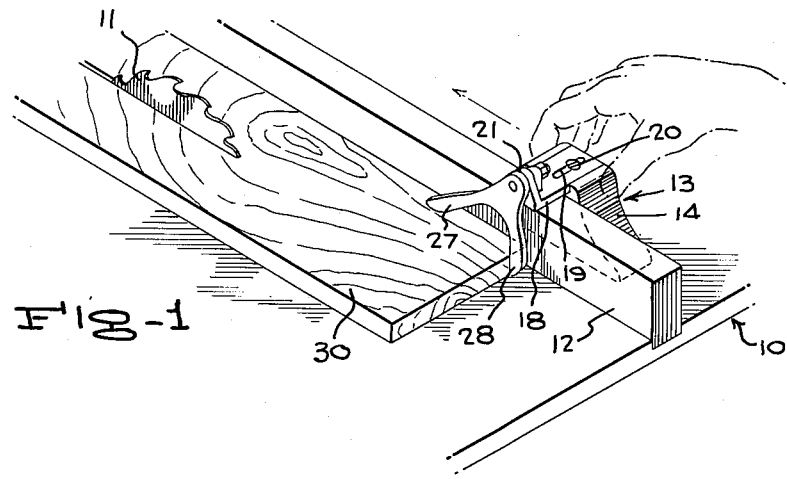
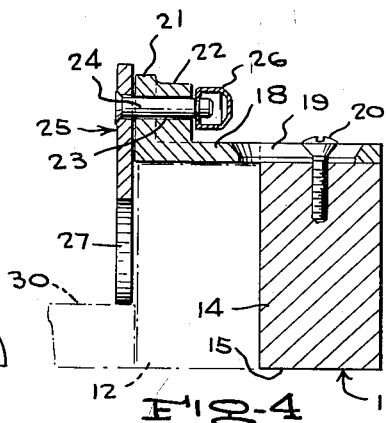
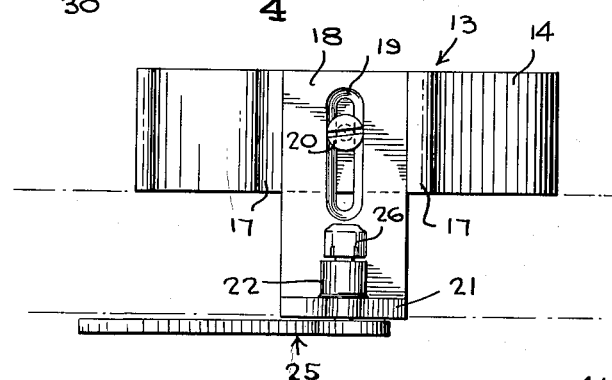
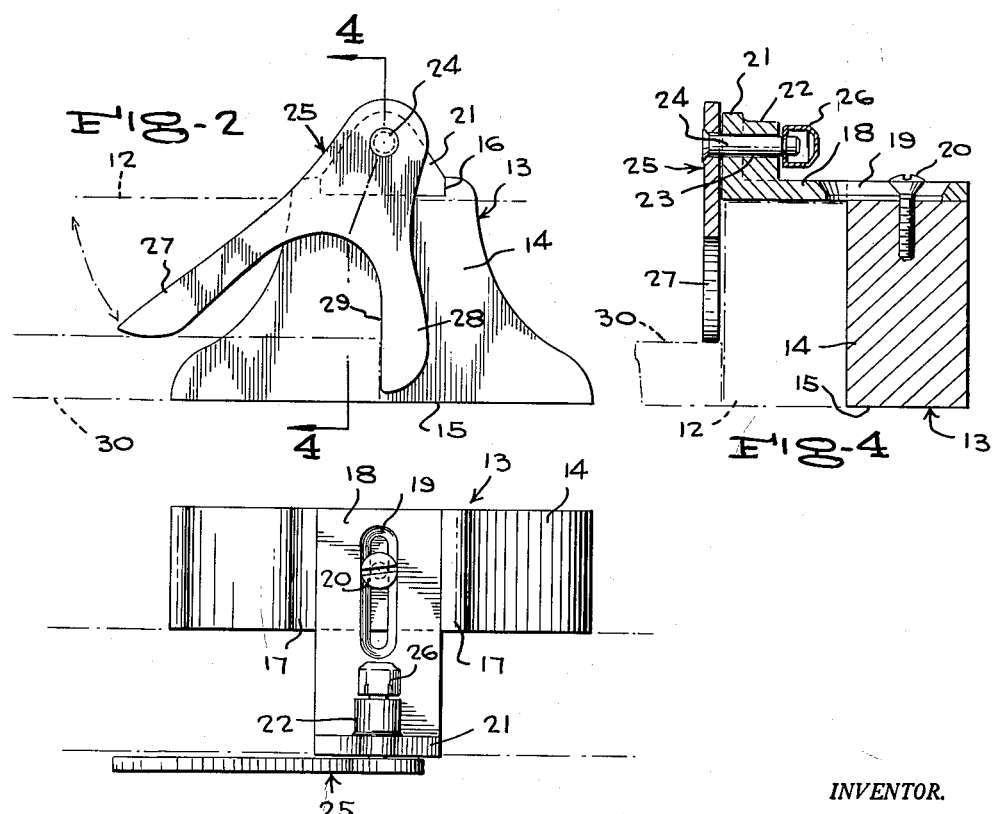
INVENTOR.
ALFRED J. WILSON
BY
Christian R. Nielsen
ATTORNEY 2,985,202
Patented May 23, 1961

2,985,202
CIRCULAR SAW SAFETY DEVICE
Alfred J. Wilson, 937 N. Evans St., Pottstown, Pa.

Filed Apr. 12, 1960, Ser. No. 21,707

2 Claims. (Cl. 143—51)

This invention relates to a safety device for use in conjunction with the feeding of material to circular saws and the like and it consists in the constructions, arrangements and combinations herein described and claimed.

The present day practice of feeding work to a rotary power saw is to advance the material into the path of rotation of the saw by means of a pushing block or the like, urged in the direction of the saw by the operator and obviously, this procedure presents a hazard to the hand of the operator in the event of slippage of the block or the operator's hand.

It is therefore the cardinal object of the invention to provide a means for holding and advancing the work into the path of rotation of the saw during the ripping or cutting operation, which work is guided by a fence on the saw table; the operator's hand for so advancing the work being positioned upon the side of the fence which is out of line with the movement of the material and the holding and advancing means.

More specifically, it is an object of the invention to provide a safety means for holding and advancing material to be sawed, into the path of rotation of a rotary power saw in which a body member and a material holding and advancing member is adapted to straddle the fence of the work table and having slidable movement therealong, the holding and advancing member consisting of a pair of dogs, one of which engages the upper side of the work preventing a whipping or chattering action which may develop during sawing, while the other dog advances the work when the body member is moved in the direction of the saw, the latter occupying a position on that side of the fence opposite the material guiding face of the fence.

It is also an important object of the invention to provide a novel construction of means for holding and advancing the work toward the saw and which is laterally adjustable to accommodate varying widths of fences of saw tables.

Additional objects, advantages and features of invention will be apparent from the following description considered in conjunction with the accompanying drawing, wherein, Figure 1 is a perspective view of the invention in use.

Figure 2 is a side elevation of the safety device.

Figure 3 is a top plan view thereof and,

Figure 4 is a cross section taken on the line 4—4 of Figure 2.

Referring more particularly to the drawing, there is illustrated a saw bench or table generally indicated by the reference character 10, and as is well understood affords support for a conventional power saw 11. The table further includes a conventional fence 12 forming a guide for moving material into engagement with the cutting edge of the saw.

The safety device 13 comprises a body member 14, in the form of a pedestal of suitable width and of a height slightly greater than the height of the fence 12 and preferably the ends of the body member are of an ogee formation in opposite directions to provide a substantial planiform base 15 for sliding movements upon the saw table 10. The side walls of the pedestal or body member are planiform, one of which will engage a side face of the fence as will be apparent as the description proceeds.

The top side of the pedestal is provided with a seat 16 extending transversely thereof, with respect to the base 15, the seat being so formed as to provide a pair of spaced parallel ribs 17. A plate 18 of suitable length and of a width to be received within the seat is employed for mounting the plate for a purpose as will presently appear. It will be noted that the ribs 17 hold the plate against oscillating movements, yet the plate may slide transversely of the seat for purpose of adjustment and may be retained in a desired position by virtue of the slot 19 and clamping screw 20. The front or free end of the plate 18 is provided with a vertically disposed flange 21 upon the inner face of which there is formed a boss 22. The flange and boss are provided with a bore 23 and together form a bearing for a shaft 24 of a work moving means 25. The shaft 24 may be retained within the bearing by any suitable nut 26 and since there is no lateral strain upon the shaft, a slip-type nut has been illustrated, inasmuch as this type of nut permits quick assembly of different sizes of work moving means, to accommodate different thicknesses of boards, as well as eliminating the need for threading the shaft.

As best seen in Figures 1 and 2, the work moving means 25 is of substantially triangular formation, in the apex of which the shaft 24 is mounted and further is longitudinally bifurcated to provide a front dog 27 and a rear dog 28, the rear faces of the free ends of which are arcuate shaped to permit ready feeding of lumber into an operative position for engagement by the dogs, as well as to prevent marring the surface of the lumber.

It will be noted that the front dog is of greater length than the rear dog and that the inside face 29 of the rear dog, when in operative position with a piece of lumber will be at right angles to the end of the lumber, with the front dog 27 in contacting engagement upon the upper surface of the lumber, a substantial distance in advance of the rear end of the lumber.

In use, with the safety device 25 mounted upon the fence 12 and it is desired to rip the piece of lumber indicated at 30, the material is laid flat upon the saw bench, one edge thereof being in contacting engagement with the side of the fence 12 for guidance. The forward end of the lumber when moved forward toward the safety device, will contact the rear dog 28 causing the safety device to swing upwardly until the rear portion of the lumber is reached so as to release the dog 28, which will permit the safety device to swing downwardly, but such movement will be arrested by the front dog coming into contact with the lumber. The operator now merely grasps the pedestal or body member 14, which it will be remembered, is positioned upon the opposite side of the fence 12 to that engaged by the lumber, and exerts a pushing pressure to advance the safety device so that the face 29 engages the end of the lumber; continued movement of the safety device will move the lumber into the path of rotation of the saw.

It will be seen that with the forward dog 27 engaging the lumber in advance of the rear dog 28, the pressure exerted by the dog 27 will prevent a whipping or chattering motion during sawing of the lumber.

While I have shown and described a preferred form of the invention, this is by way of illustration only, and I consider as my own all such modifications in construction as fairly fall within the scope of the appended claims.

I claim:

1. A safety device for use with power saws for advancing lumber into cutting engagement with the saw comprising in combination with a saw bench and fence, a body member positioned upon that side of the fence opposite the side for guiding the lumber to the saw, said body member having a transverse plate provided with an upstanding flange, a lumber engaging and holding means pivotally mounted upon said upstanding flange, said engaging and holding means comprising a rear dog for engaging the rear end of the lumber and a front dog for contacting the upper surface of the lumber, said front dog being of a length greater than the rear dog, said transverse plate being laterally adjustable to accommodate fences of varying widths.

2. The structure of claim 1, in which the front face of said rear dog is so constructed as to assume a right angular relation to the end of the lumber of a given thickness.

References Cited in the file of this patent

UNITED STATES PATENTS

| | | |
|---|---|---|
| 1,499,552 | Sampson | Mar. 27, 1923 |
| 2,410,467 | Valentine | Nov. 5, 1946 |
| 2,696,852 | Dunton | Dec. 14, 1954 |
| 2,788,032 | Lee | Apr. 9, 1957 |

FOREIGN PATENTS

| | | |
|---|---|---|
| 185,254 | Great Britain | Sept. 7, 1922 |
| 456,927 | Great Britain | Nov. 18, 1936 |